United States Patent
Buehrig

[15] 3,694,025
[45] Sept. 26, 1972

[54] AUTOMOBILE

[72] Inventor: Gordon M. Buehrig, Laguna Hills, Calif.

[73] Assignee: Ford Motor Company, Dearborn, Mich.

[22] Filed: Aug. 19, 1970

[21] Appl. No.: 64,985

[52] U.S. Cl. ................................. 296/64, 296/66
[51] Int. Cl. .................................... B60n 1/10
[58] Field of Search ......... 296/64, 65 R, 66, 69, 28 R

[56] References Cited

UNITED STATES PATENTS

| | | | |
|---|---|---|---|
| 3,408,103 | 10/1968 | Hewitt | 296/66 |
| 3,059,960 | 10/1962 | Komorowski et al. | 296/65 R |
| 1,887,947 | 11/1932 | Savale | 296/66 X |
| 2,502,061 | 3/1950 | Radford | 296/66 |
| 2,642,120 | 6/1953 | Cochran | 296/65 R X |
| 3,317,238 | 5/1967 | Smoll | 296/69 |
| 3,336,071 | 8/1967 | Neale et al. | 296/64 |
| 1,372,148 | 3/1921 | Lancia | 296/64 X |
| 1,543,818 | 6/1925 | Belden | 296/65 R |

OTHER PUBLICATIONS

Jaguar XK-E Advertisement, Received February 4, 1964.

Primary Examiner—Benjamin Hersh
Assistant Examiner—Leslie J. Paperner
Attorney—Keith L. Zerchling and John J. Roethel

[57] ABSTRACT

The invention provides an automobile capable of production in very small size without sacrificing driver comfort while retaining capability of carrying a passenger or, alternatively, a large load or a substantial quantity of belongings by omitting a dividing wall between the driver and passenger compartment and the trunk compartment of the vehicle, by providing those compartments with a common and generally level floor in which a driver's seat well is formed utilizing an area as large as necessary to insure his maximum comfort and which, in the small sized vehicle, extends halfway or more of the distance across the interior of the driver and passenger compartment. The floor over the passenger position covers a second well in which a passenger's seat is installed at a position rearward of the most rearward driving position of the driver's seat. In the preferred embodiment, the floor over the passenger's seat well is formed in part by a convertible toeboard and by elements of the passenger's seat.

2 Claims, 7 Drawing Figures

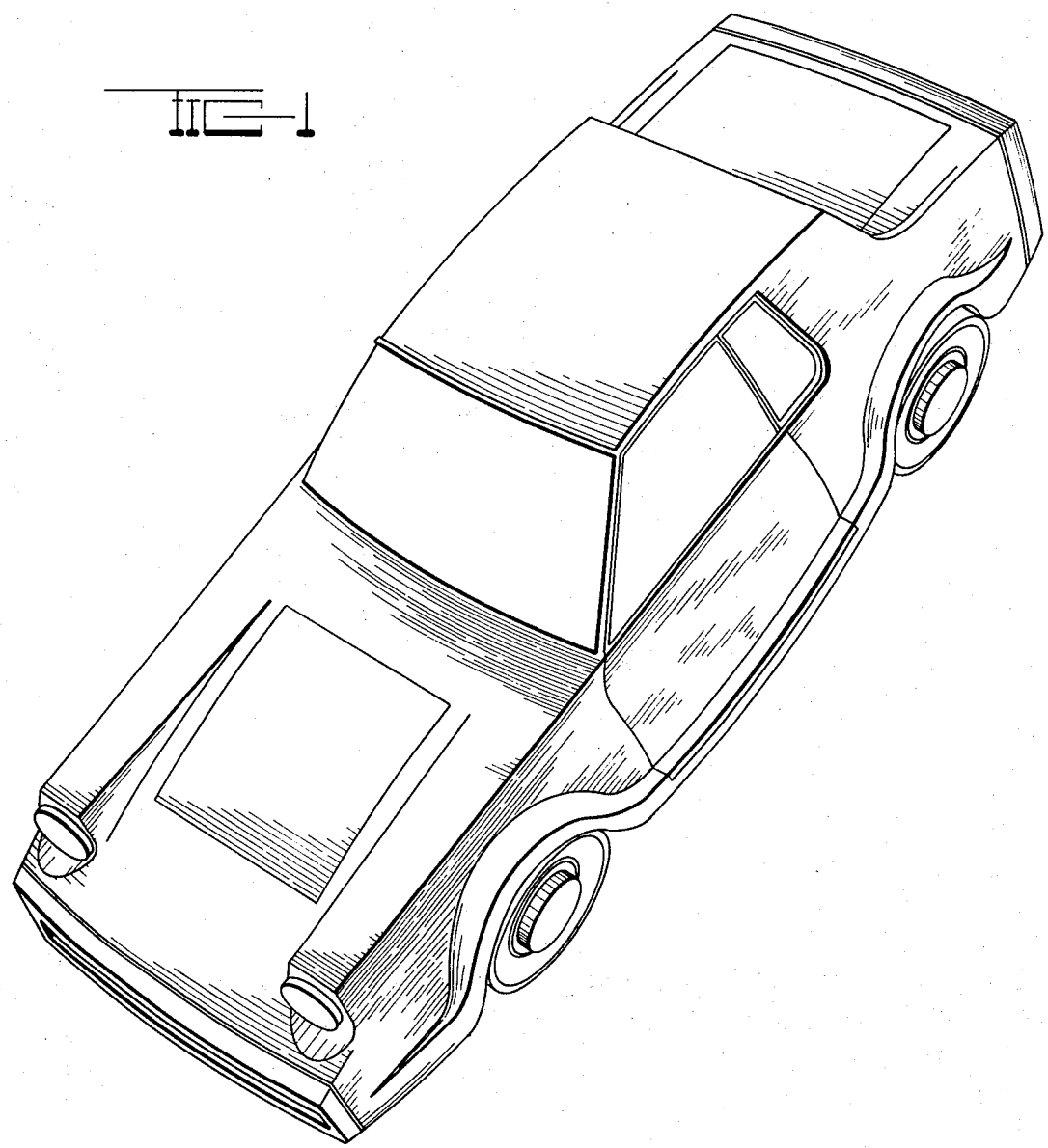

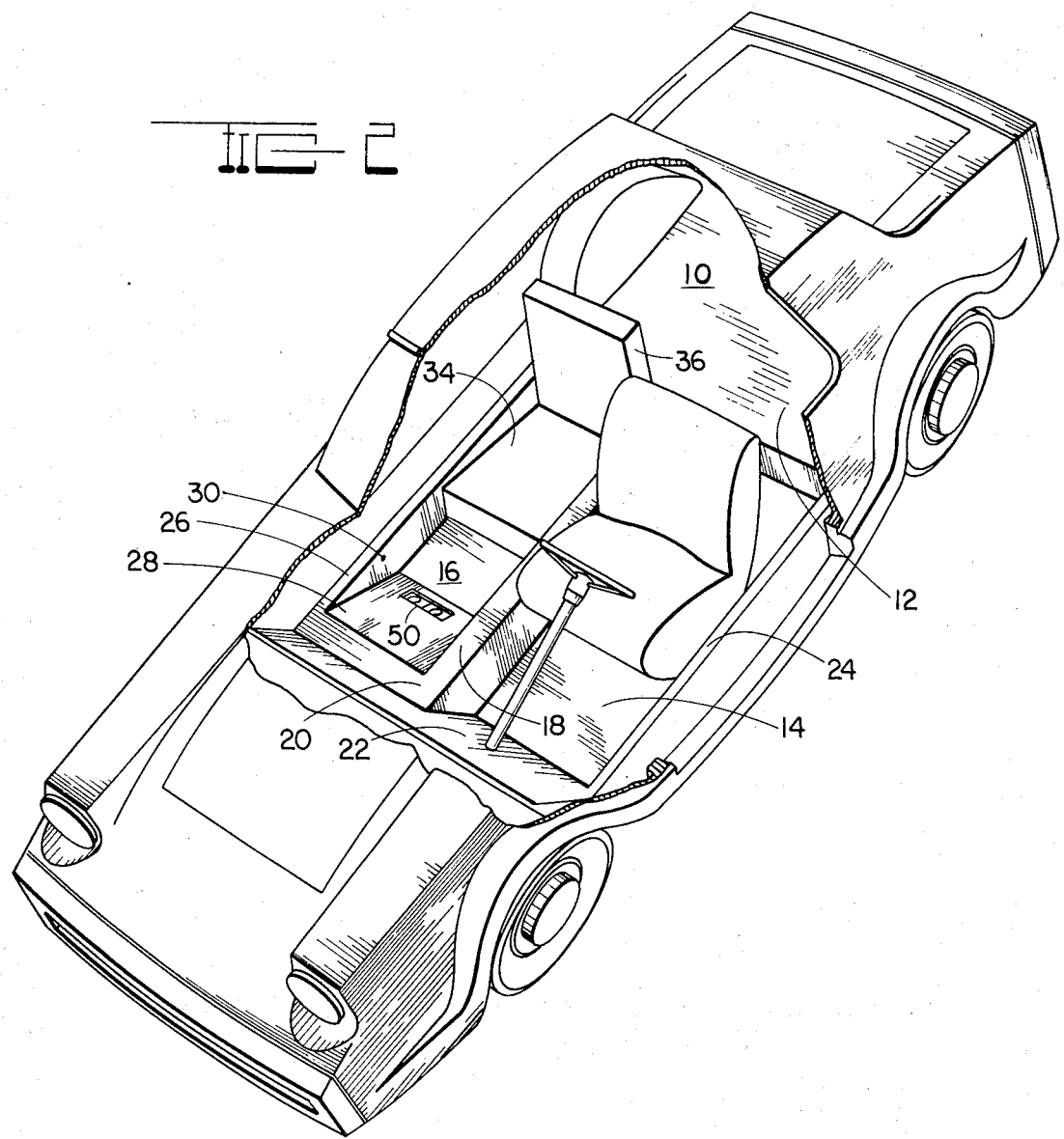

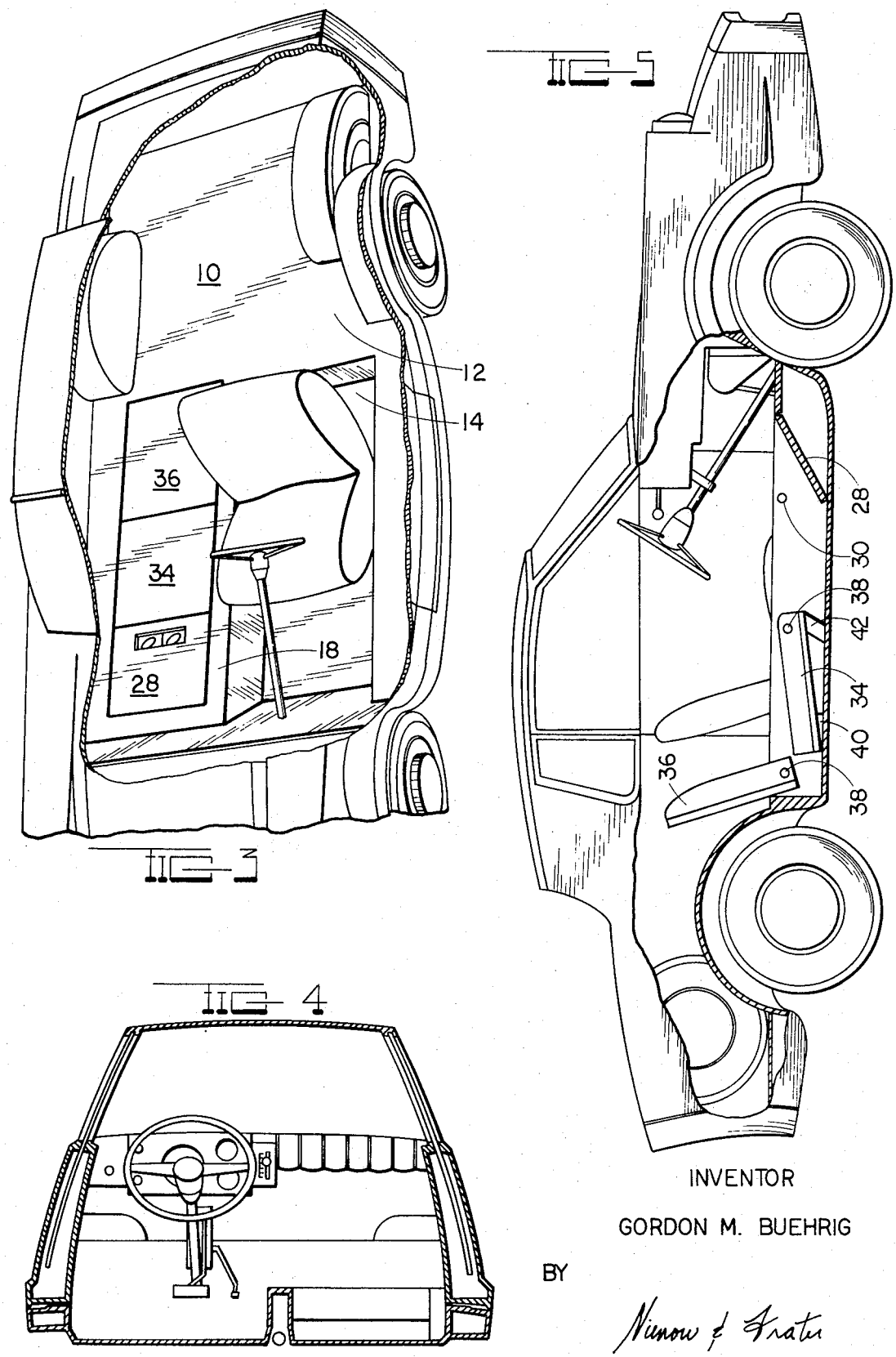

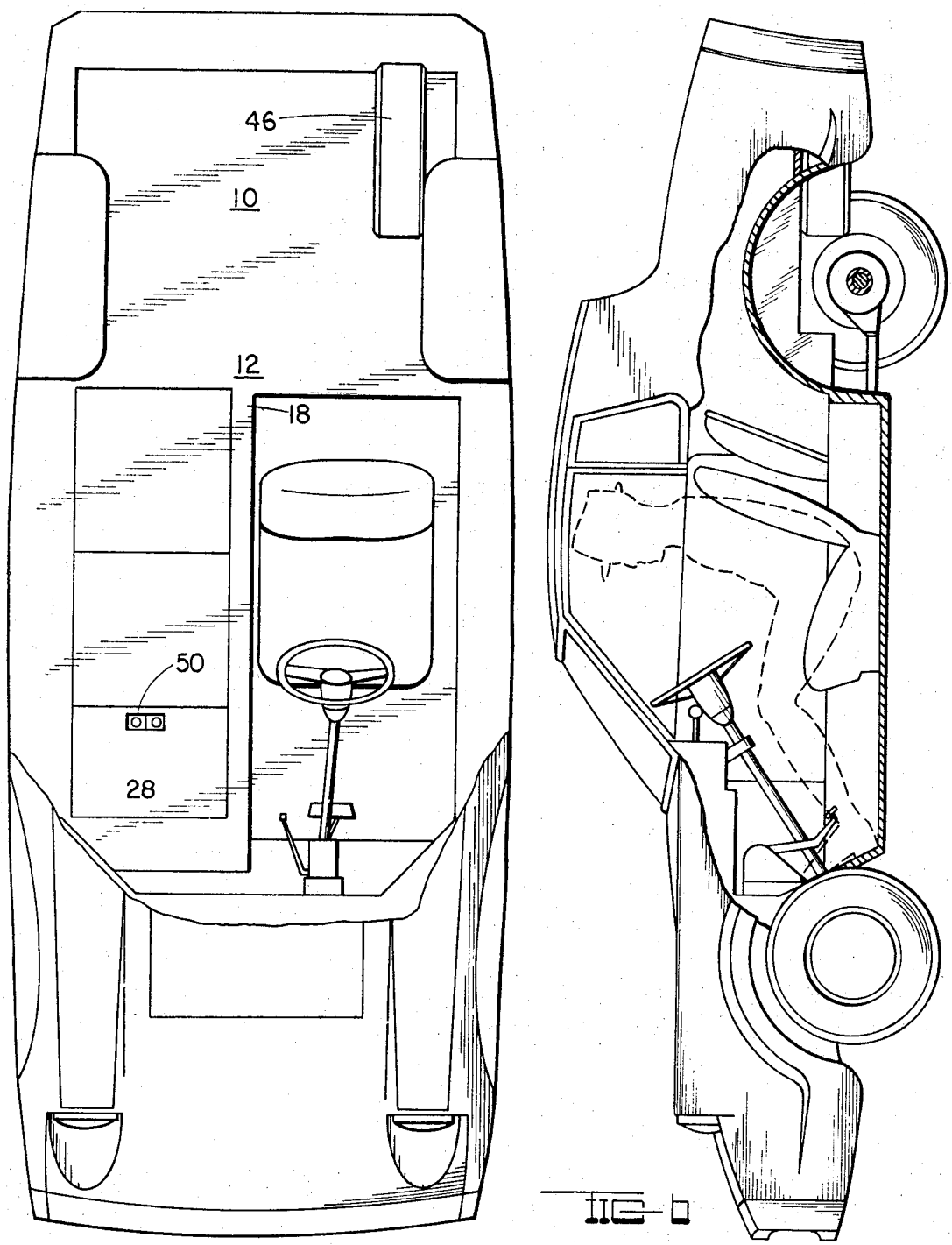

AUTOMOBILE

This invention relates to improvements in automobiles.

Among the functions of an automobile is the transportation of people and "things" or loads. It is a task of the automobile designer to accomplish these purposes as efficiently as possible and the difficulty with which that purpose is accomplished increases greatly as the size of the vehicle is reduced. The grocery bags, brief cases, golfing equipment and the other articles that must be carried do not diminish in size. Nor does the driver or his passenger diminish in size. In creating prior art automobiles, designers have generally attempted to accommodate the demand for small total vehicle size by reducing the size of seats and storage spaces along with size reduction of other elements of the automobile. That approach results in loss of both comfort and function. In addition, these efforts to reduce vehicle size by shrinking the vehicle down closer to the occupants have often resulted in a vehicle whose greenhouse and body are disproportionate whereby aesthetic appeal and marketability of the product is sacrificed.

It is an object of the invention to provide an interior arrangement for automobiles which overcomes these disadvantages. It is an object to provide an automobile which can be produced in very small size without sacrificing the room and comfort available for the driver, which is convenient for carrying things, which can carry a passenger comfortably and which enhances opportunity for incorporating aesthetic appeal. The invention takes advantage of the fact that automobiles are called upon to carry either a passenger or a large load more frequently than they are called upon to carry both a passenger and a large load. Its object is to provide a small vehicle which is convertible from passenger to load carrying capacity so that the compromise is made in terms of time rather than in space. The station wagon is convertible in this sense but station wagons are always larger than their passenger car counterparts having a similar wheelbase.

Current estimates place the average number of occupants of automobiles at 1.8. That is the average; many vehicles are driven without a passenger most of the time. Moreover, many drivers have access to more than one automobile. If one is equipped to carry passengers, it is apparent that there is less need that a second car be so equipped. The conclusion is drawn that a small automobile, capable of low cost production and operation because of its small size, which offers full comfort to its driver, which is capable of carrying long and bulky loads, and which can instead carry a passenger with reasonable comfort, will prove to be an optimum vehicle for many automobile users. It is an object to provide such an automobile. Another object is to provide such a vehicle which is not only convertible from passenger to load carrying form but which is arranged so that either form can be made the usual form. A related object is to provide a vehicle which is capable of optimum performance for commuters and for persons who often drive alone and may be required to transport things while driving alone. It is an object of the invention to provide an optimum personal car.

These and other objects and advantages of the invention which will hereinafter appear are realized in part by the provision of an automobile whose interior is characterized by a flat floor extending over the whole of the interior, including the trunk space in the preferred embodiment, except at the driver's position. At that position a well is formed for the driver's seat, the width of which is not compromised despite reduction in vehicle size and which may extend beyond the center line of the vehicle. The floorboard or deck at the passenger's side covers a well for a passenger's seat. The seat can be folded up to accommodate a passenger preferably at a position behind the rearmost driving position of the driver's seat. This arrangement places the passenger's arms and elbows behind the driver's seat so that the passenger is afforded a reasonably comfortable space notwithstanding that his seat well is narrower than the driver's seat well. In the preferred embodiment, the driver's seat is adjustable to a position rearwardly of the most rearward driving position to a point adjacent the passenger's seat so that the driver and passenger can sit together while the vehicle is not being driven.

In the drawings, all of which are partly schematic:

FIG. 1 is a perspective view from the top and left side of an automobile embodying the invention;

FIG. 2 is a perspective view of the automobile of FIG. 1, portions of the walls and roof being broken away to expose the interior of the driver and passenger compartment;

FIG. 3 is a fragmented perspective view of the vehicle with portions of its walls and roof and trunk lid broken away showing the interior of the driver and passenger compartments and the trunk compartment and illustrating the arrangement of those compartments when the passenger's seat is folded away;

FIG. 4 is a cross-sectional view of the automobile taken on a transverse plane through the driver and passenger compartment looking forward;

FIG. 5 is a fragmented elevational view of the right side of the automobile shown with the passenger seat erected and the driver's seat retracted to the rearmost driving position;

FIG. 6 is a fragmented elevational view showing the left side of an alternative vehicle, arranged with an elevated trunk floor to accommodate a line differential and axle and spare tire and wheel assembly, the passenger seat having been folded away and the driver's seat moved forward to an intermediate driving position; and FIG. 7 is a fragmented view in top elevation showing the condition illustrated in FIG. 3 from the top.

One of the attributes of the invention is that it permits wider latitude in the aesthetic design of smaller automobiles. FIG. 1 illustrates this feature. One cannot readily discover from the proportions of the automobile thereshown or whether that automobile is, or is not, a full sized passenger vehicle. That same vehicle is illustrated in all of the other Figures of the drawing including FIG. 6 in which a "standard man" has been drawn to provide a size reference. The specific embodiment selected for illustration has an overall length of 153¼ inches. It has a total overall height of fifty inches and an overall width of 64½ inches. Thus, it is a very small automobile. Notwithstanding that fact, the volume of the driver and passenger compartment that is devoted to the driver is as great as it is in full sized luxury sedans. In the preferred embodiment shown in the drawings, the seat is retractable to an extreme position rearward of the rearmost driving position. Because of this feature, the space devoted to the driver can be, and in this preferred embodiment is, greater than the space devoted to the driver in most luxury sedans.

Notwithstanding that a large space is devoted to the driver, the invention provides an automobile in which a large number of articles are conveniently transported. The vehicle is provided with a passenger seat but that seat is folded down and covered with a floor section. In preferred form, a portion of the floor of the passenger's seat well is raised so that the passenger well is entirely covered. That cover becomes part of the floorboard which extends at uniform height throughout the passenger and driver's compartment except at the driver's seat well. In the preferred embodiment, that compartment is open to the trunk compartment whose floor is continued at the same level as that of the floor of the driver and passenger compartment. This arrangement provides a large, flat load carrying space. Access to that load carrying area is had at the passenger's door at the right or through the trunk lid at the rear. In this particular embodiment, the trunk lid does not extend beyond the area above the trunk. In another embodiment the lid could be extended to include part of the rear surface of the car so that it could be lifted to accommodate loads that extended from the rear of the automobile straight out from the floor.

Examination of FIGS. 1, 6 and 7 will illustrate that the use of the smaller and less expensive trunk lid arrangement of the preferred embodiment does not seriously limit the vehicle's ability to handle extra length loads. Very long articles can extend from the toeboard at the front of the passenger's position back through the driver and passenger compartment and through the trunk compartment and the open trunk lid. Thus, this automobile can accommodate the hauling of many very long articles as well or better than a full sized, conventional automobile. Such tasks as carrying skis and a golf bag mounted on a cart and some other jobs that are accomplished only with considerable inconvenience in many automobiles, are very easily accomplished in this automobile. Loads need not be lifted up and out when removed through the passenger door of this vehicle. Not only does the arrangement of the invention provide more than the usual load carrying space, but it provides that space in a form that permits easier loading and unloading and which also permits easier cleaning because the floor is constructed at uniform level.

The floor design includes the upper face of the "tunnel" between the driver's seat well and the passenger's seat well. Advantageously, the top of the tunnel is arranged at the same level or substantially at the same level as the other areas of the floor. The tunnel accommodates an exhaust pipe and, in a rear wheel drive vehicle, it can accommodate the propeller shaft. Neither the shaft nor the exhaust pipe need be mounted on the longitudinal center line of the vehicle. In the invention the tunnel is located at whatever distance from the driver's side wall of the vehicle is required to provide a driver's seat well that will insure adequate driving comfort. In the smaller automobiles the tunnel will be placed at the passenger's side of the vertical center plane of the vehicle. As illustrated in this embodiment, the driver's seat well may extend more than half way across the driver and passenger compartment. The passenger's seat well is thus limited so that it extends less than half way across that compartment. Adequate elbow room for the passenger is provided by mounting his seat rearwardly of the rearmost driving position of the driver's seat. This is illustrated best in FIGS. 2 and 5. Means are provided for adjusting one of the seats into alignment with the other. Thus, in the preferred embodiment, the driver's seat and the driver's seat well are arranged so that the driver's seat can be retracted rearwardly of the rearmost driving position to a position alongside the passenger seat.

The preferred embodiment is described in greater detail as follows. In the drawings, the numeral 10 designates the floor or storage deck of the luggage compartment of the vehicle. The numeral 12 designates the floor of the driver and passenger compartment. That floor includes the area immediately to the rear of the driver's seat well 14 and the passenger's seat well 16. It also includes the upper surface of the tunnel 18 that divides the driver's seat well 14 and passenger's seat well 16. In this embodiment the floor or storage deck of the passenger compartment extends to the region 20 behind the forward ramp 22 and it includes the upper surfaces 24 and 26 that extend over the side frame members at the outboard side of the driver's seat well and the passenger's seat well, respectively. This embodiment is arranged with a second toeboard at the passenger's side at the forward end of the well 16. This second toeboard 28 is necessary because the passenger's seat is positioned rearwardly too far for the occupant to reach the forward board 22. It is arranged so that it can be lifted to become part of the floor as illustrated in FIGS. 3 and 7. As best illustrated in FIG. 5, a means 30 is provided for holding the board 28 in the raised position when the passenger's area is to be converted to a storage compartment. While in this embodiment the forward fire wall 32 is retained at the standard position in front of the passenger's seat well so that area 20 will be available as part of the storage deck, it will be apparent that the fire wall could be moved rearwardly at the passenger side if there was a need to increase the size of the engine compartment at that side. The passenger's seat comprises a lower seat cushion 34 and a back rest 36 which have a hinged connection at hinge 38. Means are provided by which the seat cushion and back rest can be used to form the surface of the storage deck over the passenger seat well when it is desired to convert that area to non-seating use. In this embodiment there are structural elements 40 and 42 formed at the bottom of the passenger's seat well which serve to hold the seat in position to form a flat floor. In this embodiment the seat and back rest are simply inverted so that the lower portion of the seat cushion 34 and the back portion of the back rest 36 extend upwardly and form the deck surface. A variety of arrangements are possible and practical including the use of telescoping shelves that are stored with the passenger well ramp 28, and other schemes.

The spare tire and wheel assembly is mounted vertically in the trunk space where it fits into a well behind the driver's seat. In a front drive vehicle the tire and wheel assembly could easily be mounted in a well below the floor 10 of the trunk space.

In the preferred embodiment the floor of the vehicle has uniform height throughout both compartments. This feature presents no difficulty in practice in the case of front wheel drive vehicles or in the case of rear wheel drive vehicles when the rear wheels are independently suspended. The designer has less freedom in the case of rear wheel drives employing a "live" axle. While uniform floor level is possible, increasing floor height by a small amount in the trunk compartment is preferred at least in very small vehicles. The increased height is needed to accommodate vertical movement of the differential gear housing but providing it achieves other advantages. The increased trunk floor height permits storage of the spare wheel and tire horizontally in a well below a cover in the trunk compartment floor. Further, the provision of a step from the lower floor level of the driver and passenger compartment to the higher floor level of the trunk area forms a stop to prevent rolling and excessive shifting of loads without impairing the ability to carry a surfboard, skis or other long articles.

An embodiment with increased trunk floor height is illustrated in FIG. 6. The vehicle of that figure has the same overall height and length of the embodiment shown in the other figures. The driver's floor is close to 8 inches below the floor level of the remainder of the compartment as in the other embodiment. The level of the trunk floor is slightly more than 3 inches higher than that of the driver and passenger compartment floor. The change in elevation could be made gradually but a relatively abrupt change is preferred as an aid to controlling and preventing load shift.

In FIG. 7, the spare tire and wheel assembly are shown mounted in a vertical position. This same figure illustrates the driver and passenger compartment appearance when the passenger seat well is covered. The toeboard 28 is shown raised. In this case the means for holding the toeboard up includes a pair of bolts which extend from the sides of the board and fit into openings 30 (see FIGS. 2 and 5). The bolts are readily retracted by a finger operated mechanism 50. Any suitable alternative may be employed.

The invention is particularly suited to vehicles of small size in which case the driver's seat well will extend to half or more of the width of the car. Nonetheless, certain of the features of the invention, hinged passenger toeboard, covered passenger seat well, open communication from trunk compartment to driver-passenger compartment and others, while especially useful when combined with the proportionately wide driver's seat well, do not depend upon inclusion of the proportionately wide well. More luxurious versions of the automobile might be made wider than the embodiment shown, in which case the tunnel might be centrally positioned and the passenger seat aligned with the driver's seat.

Although I have shown and described certain specific embodiments of my invention, I am fully aware that many modifications thereof are possible. My invention, therefore, is not to be restricted except insofar as is necessitated by the prior art.

I claim:

1. In an automobile, a longitudinally extending vehicle body having a passenger compartment extending across the body in its mid-region and a luggage compartment to the rear of the passenger compartment, the vehicle body including a driver's seat well extending from one side of the compartment no less than half-way across the compartment and a passenger's seat well extending from the opposite side of the compartment to less than halfway across the compartment, the vehicle body having a tunnel dividing the driver's seat well and passenger's seat well, a raised floorboard covering the area immediately to the rear of the driver's and passenger's seat wells and the upper surface of the tunnel, the raised floorboard also covering the edges of the passenger's and driver's seat wells and extending outwardly over the side frame members of the vehicle body, a driver's seat mounted in the driver's seat well supported on adjustable support means, the adjustable support means permitting movement of the driver's seat between forward and rear driving positions, a passenger seat mounted in the passenger's seat well comprising a lower seat cushion and a back rest, pivot means supporting the seat cushion and back rest for swinging movement to an inverted position in which the back of each lies in coplanar relationship to the floorboard surface thereby to increase the load carrying area of the floorboard, in passenger carrying condition the passenger seat mounted in the passenger's seat well lying rearwardly of the rear driving position of the driver's seat, the driver's seat being movable beyond its rear driving position to a position adjacent the passenger's seat, a platform extending into the luggage compartment from the rear edge of the raised floorboard to provide further load supporting area, an auxiliary toe board positioned at the forward end of the passenger's seat well in spaced relationship to the passenger's seat when the latter is arranged in seat carrying condition, and pivot means supporting the auxiliary toe board for swinging movement from toe board position to a coplanar position relative to the floorboard whereby when the passenger's seat cushion and backrest are inverted the passenger's seat well is completely covered.

2. In an automobile, a longitudinally extending vehicle body having a passenger compartment extending across the body in its mid-region and a luggage compartment to the rear of the passenger compartment, the vehicle body including a driver's seat well extending from one side of the compartment no less than half-way across the compartment and a passenger's seat well extending from the opposite side of the compartment to less than halfway across the compartment, the vehicle body having a tunnel dividing the driver's seat well and passenger's seat well, a raised floorboard covering the area immediately to the rear of the driver's and passenger's seat wells and the upper surface of the tunnel, a passenger seat mounted in the passenger's seat well comprising a lower seat cushion and a backrest, pivot means supporting the seat cushion and backrest for swinging movement to an inverted position in which the back of each lies in coplanar relationship to the floorboard surface thereby to increase the load carrying area of the floorboard, a platform extending into the luggage compartment from the rear edge of the raised floorboard to provide further load supporting area, an auxiliary toe board positioned at the forward end of the passenger's seat well in spaced relationship to the passenger's seat when the latter is arranged in seat carrying condition, and pivot means supporting the auxiliary toe board for swinging movement from toe board position to a coplanar position relative to the floorboard whereby when the passenger's seat cushion and backrest are inverted the passenger's seat well is completely covered.

* * * * *